United States Patent [19]
Augart et al.

[11] 3,920,704
[45] Nov. 18, 1975

[54] N-SUBSTITUTED IMINOCOUMARIN DYES

[75] Inventors: Dietmar Augart, Ludwigshafen; Wolfgang Mach, Hockenheim; Horst Scheuermann, Ludwigshafen, all of Germany

[73] Assignee: BASF Aktiengesellschaft, Ludwigshafen (Rhine), Germany

[22] Filed: July 11, 1973

[21] Appl. No.: 378,065

[30] Foreign Application Priority Data
July 12, 1972 Germany............................ 2234207

[52] U.S. Cl.............. 260/345.2; 8/177 A; 8/177 B; 8/179; 260/304; 260/309.2; 260/332.2 R; 260/332.2 C; 260/293.58; 260/326.34; 260/268 B; 260/268 C; 260/247.2 A; 260/295 K; 260/256.4 Q

[51] Int. Cl.$^2$....................................... C07D 311/58
[58] Field of Search................................ 260/345.2

[56] References Cited
UNITED STATES PATENTS
3,468,897   9/1969   Fournari et al.................. 260/345.2

Primary Examiner—John M. Ford
Attorney, Agent, or Firm—Johnston, Keil, Thompson & Shurtleff

[57] ABSTRACT

Acylated 2-imino-3-substituted-7-amino-substituted coumarins which are useful as disperse dyes or basic dyes. The dyes give brilliant yellow dyeings, particularly on polyesters and acrylonitrile polymers.

2 Claims, No Drawings

N-SUBSTITUTED IMINOCOUMARIN DYES

The invention relates to compounds of the formula (I):

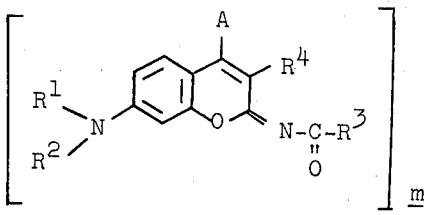

in which m is one of the integers 1 and 2;
A is hydrogen or alkyl of one to four carbon atoms;
$R^1$ is hydrogen, alkyl of one to four carbon atoms, alkyl of one to four carbon atoms and bearing alkoxy, chloro, bromo, carboxyl, carbalkoxy, carbamoyl or acetoxy as a substituent, cyclohexyl, benzyl or phenyl;
$R^2$ is hydrogen, alkyl of one to four carbon atoms, alkyl of one to four carbon atoms bearing alkoxy, chloro, bromo, carboxyl, carbalkoxy, carbamoyl or acetoxy as a substituent, cyclohexyl, benzyl or phenyl;
$R^1$ and $R^2$ together with the nitrogen may be the radical of a five-membered or six-membered heterocyclic ring;
$R^3$ (when m is 1) is unsubstituted or substituted alkyl, aralkyl, aryl or heteroaryl, unsubstituted or substituted vinyl, alkoxy, phenoxy or amino;
$R^3$ (when m is 2) is alkylene, phenylene or one of the radicals $-O(CH_2CH_2O)_m-$, $-CH_2OCH_2-$ or

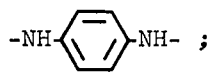

$R^4$ is one of the radicals:

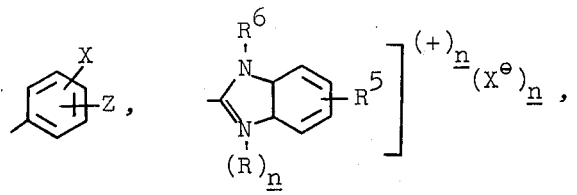

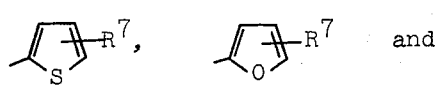 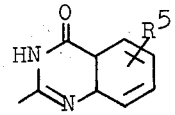

R is hydrogen, unsubstituted or substituted alkyl or benzyl;
n is zero or 1;
X is cyano or nitro;
$X^+$ is an anion;
Z is hydrogen, cyano, chloro, bromo, methylsulfonyl, ethylsulfonyl, sulfonamido or nitro;
$R^5$ is hydrogen or methyl;
$R^6$ is hydrogen, methyl, ethyl, β-hydroxyethyl or β-hydroxypropyl; and
$R^7$ is hydrogen, carbalkoxy, unsubstituted or substituted carbamoyl or cyano.

Examples or specific substituents, other than those already mentioned, are:

For $R^1$ and $R^2$: methyl, ethyl, n-propyl, isopropyl, n-butyl, isobutyl, β-methoxyethyl, β-ethoxyethyl, β-acetoxyethyl, β-chloroethyl, β-carbomethoxyethyl, β-carboethoxyethyl, β-carbobutoxyethyl, β-methoxypropyl, β-ethoxypropyl, β-methoxy-γ-chloropropyl and β-acetoxypropyl.

Examples of radicals which $R^1$ and $R^2$ may form together with the nitrogen are: pyrrolidine, piperidine, morpholine, piperazine and N-methylpiperazine.

Examples of individual radicals for $R^3$ are: methyl, ethyl, n-propyl, isopropyl, n-butyl, isobutyl, tert.-butyl, chloromethyl, bromomethyl, methoxymethyl, ethoxymethyl, propoxymethyl, butoxymethyl, phenoxymethyl, methylmercaptomethyl, N-methylaminomethyl, N,N-dimethylaminomethyl, ethylmercaptomethyl, benzyl, carbomethoxymethyl, carboethoxymethyl, carbopropoxymethyl, cyanomethyl, acetylmethyl, β-chloroethyl, β-bromoethyl, β-hydroxyethyl, β-methoxyethyl, β-ethoxyethyl, β-butoxyethyl, β-phenoxyethyl, β-carbomethoxyethyl, β-carbobutoxyethyl, vinyl, β-phenylvinyl, β-(p-cyanophenyl)-vinyl, β-(p-nitrophenyl)-vinyl, methoxy, ethoxy, n-propoxy, isopropoxy, n-butoxy, isobutoxy, tert.-butoxy, β-methoxyethoxy, β-ethoxyethoxy, 4-tert.-butylcyclohexoxy, cyclohexoxy, phenyl, o-chlorophenyl, p-chlorophenyl, 2,4-dichlorophenyl, 3,5-dichlorophenyl, m-nitrophenyl, p-nitrophenyl, 2-chloro-5-nitrophenyl, o-methylphenyl, m-methylphenyl, p-methylphenyl, o-methoxyphenyl, m-methoxyphenyl, p-methoxyphenyl, 3-nitro-4-methoxyphenyl, methylamino, ethylamino, n-propylamino, isopropylamino, n-butylamino, isobutylamino, tert.-butylamino, cyclohexylamino, benzylamino, phenylamino, o-chlorophenylamino, m-chlorophenylamino, p-chlorophenylamino, p-(trifluoromethyl)-phenylamino, p-methylphenylamino, o-methylphenylamino, m-methylphenylamino, p-methoxyphenylamino, o-methoxyphenylamino and m-methoxyphenylamino. Examples of heteroaryl radicals $R^3$ are furyl, thenyl and pyridyl. Examples of alkylene and phenylene radicals $R^3$ are $-CH_2-$, $-C_2H_6-$, $C_3H_6-$,

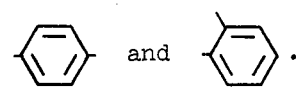

Examples of radicals R (other than hydrogen and benzyl) are: propyl, butyl, β-hydroxy-γ-chloropropyl and particularly methyl, ethyl, β-hydroxyethyl and β-hydroxypropyl.

Examples of anions $X^+$ are: chloride, sulfate, methosulfate, ethosulfate, acetate, p-toluenesulfonate, tetradichlorozincate and tetrafluoborate.

Examples of individual radicals for $R^7$ are: carbomethoxy, carboethoxy, carbo-n-propoxy, carboisopropoxy, carbo-n-butoxy, carbo-tert.-butoxy, carbamoyl, N-methylcarbamoyl, N,N-dimethylcarbamoyl and N,N-diethylcarbamoyl.

Dyes of the formula (Ia):

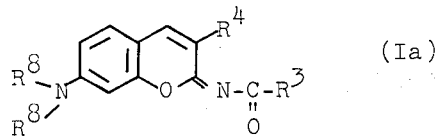

in which $R^8$ is alkyl of one to four carbon atoms and preferably methyl or ethyl and $R^3$ and $R^4$ have the meanings given above are of particular industrial significance. $R^4$ is preferably phenyl bearing halogen, cyano or nitro as a substituent, an unquaternized or quaternized benzimidazolyl or benzothiazolyl radical or a thenyl or quinazolonyl radical and $R^3$ is methyl, ethyl, n-propyl, n-butyl, tert.-butyl, chloromethyl, phenoxymethyl, phenylmethyl, cyanomethyl, acetonylmethyl, β-methoxyethyl, vinyl, β-phenylvinyl, methoxy, ethoxy, propoxy, β-methoxyethyl, phenyl, p-chlorophenyl, 2,4-dichlorophenyl, p-methylphenyl, n-propylamino, cyclohexylamino, benzylamino, phenylamino, m-chlorophenylamino, o-methylphenylamino, m-methylphenylamino or p-methylphenylamido.

The new dyes show greenish yellow fluorescence and are suitable for dyeing synthetic fibers such as polyacrylonitrile, polyester, secondary cellulose acetate and triacetate fibers, for printing textiles bright shades with pigmented resins, and for the production of daylight luminous pigments.

The compounds of the formula (I) may be prepared by acylating 2-iminocoumarins of the formula (II):

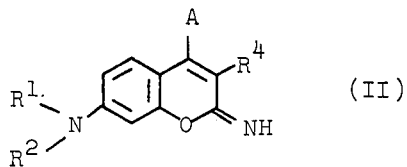

and if necessary quaternizing the reaction products; $R^1$, $R^2$, $R^4$ and A have the above meanings.

Compounds of the formula (II) in which A is hydrogen are known for example from DOS 1,619,567 and 1,569,777 and also German Patent 2,129,565. Compounds of the formula (II) in which A is alkyl of one to four carbon atoms are accessible by analogous methods.

Examples of acylating agents are acid halides, acid anhydrides, chlorocarbonic esters, isocyanates and ketenes, It is preferred to use acid chlorides, isocyanates and diketene.

Acylation may conveniently by carried out in a solvent in the presence of an inorganic or organic base, preferably an amine, at a temperature of from 0° to 150°C and preferably from 20° to 100°C.

Particularly suitable solvents are organic solvents, for example hydrocarbons such as benzene, toluene or xylene, halohydrocarbons such as 1,2-dichloroethane, chlorobenzene or dichlorobenzene, glycol ethers such as glycol diethyl ether or diethylene glycol diethyl ether, dioxane or tetrahydrofuran.

Examples of bases are: alkali metal carbonates such as sodium or potassium carbonate, alkali metal salts of lower fatty acids such as sodium or potassium acetate, and particularly organic bases such as triethylamine or pyridine. The organic base may also serve as solvent. Compounds of the formula (I) in which $R^3$ is acetonyl may be prepared by reaction of compounds of the formula (II) with diketene.

Compounds of the formula (I) in which $R^3$ is unsubstituted or substituted amino are obtained by reaction of compounds of the formula (II) with an isocyanate.

These reactions are conveniently carried out in one of the said organic solvents at temperatures of form 0° to 150°C, preferably at from 50° to 100°C.

Quaternary compounds may be prepared by quaternizing the acylated compounds by conventional methods, for example by reaction with an alkyl or aralkyl halide, an epoxide or particularly a dialkyl sulfate or arylsulfonic ester.

Details of quaternization may be seen in the Examples. The following Examples illustrate the invention. Unless otherwise stated the parts and percentages in the Examples are by weight.

EXAMPLE 1

The dye of the formula:

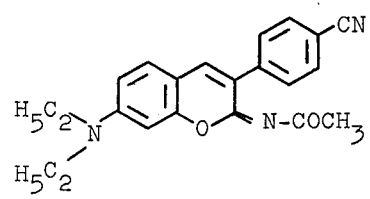

is obtained by heating a mixture of 9.51 parts of 3-p-cyanophenyl-7-diethylamino-2-iminocoumarin, 4.92 parts of sodium acetate and 100 parts of acetic anhydride for fifteen minutes at 140°C, cooling the reaction mixture to 25°C and stirring it into 1000 parts of water. After suction filtration and drying 10 parts of dye is obtained having a melting point of 180° to 182°C.

EXAMPLE 2

The dye of the formula:

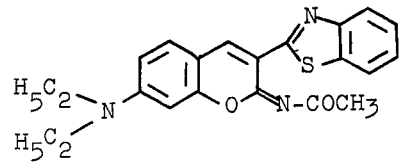

is obtained by heating a mixture of 6.98 parts of benzothiazolyl(2')-7-diethylamino-2-iminocoumarin, 1.64 parts of sodium acetate and 60 parts of acetic anhydride for fifteen minutes at 140°C, cooling the reaction mixture to 2°C and stirring it into 1000 parts of water. After suction filtration and drying 7.1 parts of the dye is obtained having a melting point of 195° to 197°C.

EXAMPLE 3

The dry of the formula:

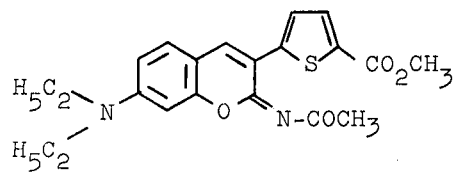

is obtained analogously to Example 1 from 7.12 parts of 3-(5'-carbomethoxythenyl-2')-7-diethylamino-2-iminocoumarin, 3.28 parts of sodium acetate and 45 parts of acetic anhydride. The yield is 6.8 parts, m.p. 176°–178°C.

EXAMPLE 4

The dye of the formula:

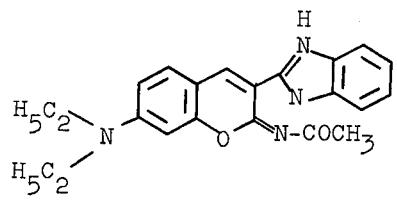

is obtained by dissolving 9.96 parts of 3-benzimidazolyl-(2')-7-diethylamino-2-iminocoumarin in 70 parts of pyridine and dripping into the solution 2.4 parts of acetyl chloride while stirring at from 30° to 35°C, continuing stirring for 4 hours at 25°C and then stirring it into 1000 parts of water. After suction filtration, drying and recrystallization from toluene 6.5 is obtained having a melting point of 300°C.

EXAMPLE 5

The dye of the formula:

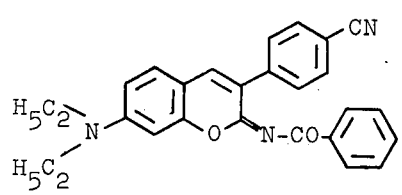

is obtained by reacting 9.51 parts of p-cyanophenyl-7-diethylamino-2-iminocoumarin and 4.3 parts of benzoyl chloride in 50 parts of pyridine analogously to Example 4. The yield of dye is 7.5 parts and its melting point is 172° to 173°C.

EXAMPLE 6

The dye of the formula:

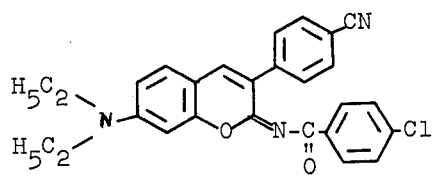

is obtained by following the procedure of Example 5 but using 5.25 parts of p-chlorobenzoyl chloride instead of benzoyl chloride. 9 parts of dye is obtained having a melting point of 188°C.

EXAMPLE 7

The dye of the formula:

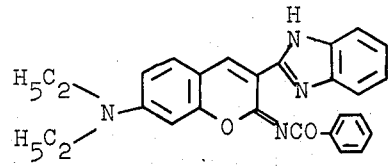

is obtained analogously to Example 4 by using 4.3 parts of benzoyl chloride instead of acetyl chloride. The yield of dye is 13 parts and its melting point is 226° to 228°C.

EXAMPLE 8

The dye of the formula:

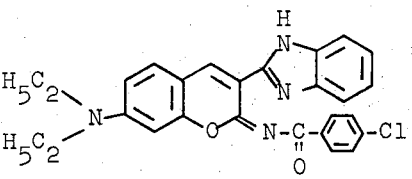

is obtained analogously to Example 4 by using 5.25 parts of p-chlorobenzoyl chloride instead of acetyl chloride. The yield of dye is 12 parts and the melting point is 218°C.

EXAMPLE 9

The dye of the formula:

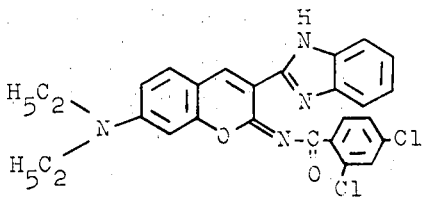

is obtained analogously to Example 4 by using 5.88 parts of 2,4-dichlorobenzoyl chloride instead of acetyl chloride. The yield of dye after recrystallization from glycol monoethyl ether is 5 parts having a melting point of 200° to 203°C.

EXAMPLE 10

The dye of the formula:

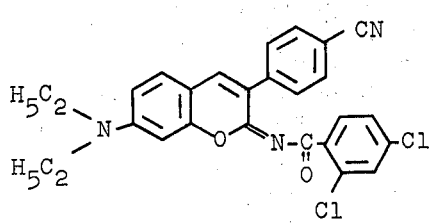

is obtained by dissolving 9.51 parts of 3-p-cyanophenyl-7-diethylamino-2-iminocoumarin in 70 parts of pyridine and dripping 6.28 parts of 2,4-dichlorobenzoyl chloride in while stirring at from 30° to 39°C, stirring for another hour at 25° C and then stirring into 1000 parts of water. After suction filtration, recrystallization from glycol monoethyl ether and drying, the yield is 9.5 parts and the melting point is 168° to 172°C.

EXAMPLE 11

The dye of the formula:

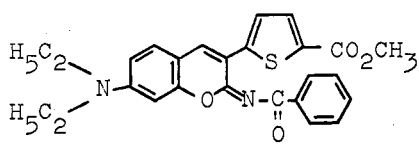

is obtained by dissolving 7.12 parts of 3-(5'-carboxymethylthenyl-2')-7-diethylamino-2-iminocoumarin in 50 parts of pyridine, dripping in 2.86 parts of benzoyl chloride while stirring and cooling to from 20° to 30°C, stirring at 20°C for another hour and then stirring into 1000 parts of water. After suction filtration and drying the yield of dye is 8.0 parts and the melting point is 150° to 152°C.

EXAMPLE 12

The dye of the formula:

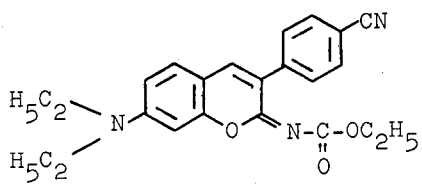

is obtained by dissolving 6.34 parts of 3-p-cyanophenyl-7-diethylamino-2-iminocoumarin in 50 parts of pyridine, dripping in 2.63 parts of ethyl chloroformate while stirring and cooling to form 20° to 50°C, stirring for another half an hour at 50°C and then stirring into 1000 parts of water. After suction filtration and drying the yield of dye is 2.0 parts and the melting point is 150° to 152°C.

EXAMPLE 13

The dye of the formula:

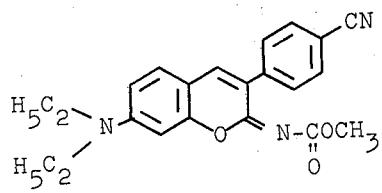

is obtained analogously to Example 12 by using 2.26 parts of methyl chloroformate instead of ethyl chloroformate. The yield is 3 parts having a melting point of 163° to 165°C.

EXAMPLE 14

The dye of the formula:

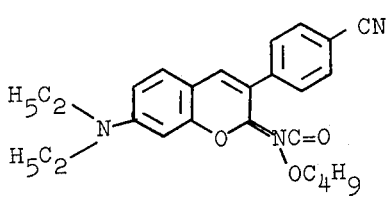

is obtained by following the procedure of Example 12 but using 3.28 parts of n-butyl chloroformate instead of ethyl chloroformate. The yield is 3.2 parts and the melting point is 178° to 179°C.

EXAMPLE 15

The dye of the formula:

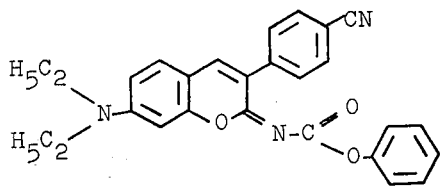

is obtained analogously to Example 12 by using phenyl chloroformate instead of ethyl chloroformate. The yield is 6 parts and the melting point is 174° to 175°C.

EXAMPLE 16

The dye of the formula:

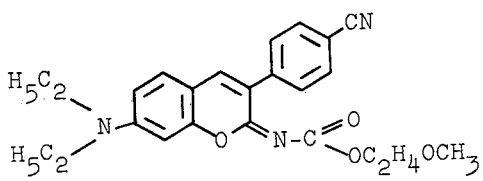

is obtained analogously to Example 12 by using 3.32 parts of β-methoxyethyl chloroformate instead of ethyl chloroformate. The yield is 6 parts and the melting point is 153° to 158°C.

EXAMPLE 17

The dye of the formula:

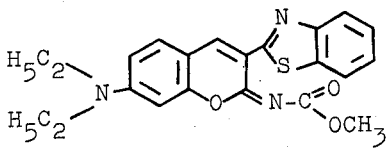

is obtained by dissolving 6.98 parts of 3-benzimidazolyl-(2')-7-diethylamino-2-iminocoumarin in 50 parts of pyridine, dripping in 2.27 parts of methyl chloroformate at from 25° to 50°C while stirring and cooling, stirring for another hour at 50°C and then stirring into 1000 parts of water. After suction filtration and drying the yield of dye is 3 parts and its melting point is 135° to 136°C.

EXAMPLE 18

The dye of the formula:

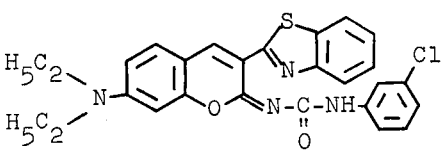

is obtained by adding 3.37 parts of m-chlorophenyl isocyanate to a solution of 6.98 parts of 3-benzothiazolyl- (2')-7-diethylamino-2-iminocoumarin in 50 parts of xylene, stirring for one hour at 90°C and then cooling to about 5°C. After suction filtration and drying 10 parts of dye is obtained having a melting point of 212° to 214°C.

EXAMPLE 19

The dye of the formula:

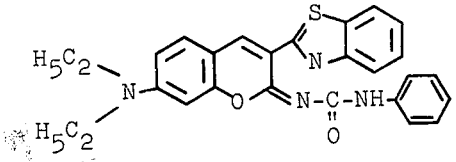

is obtained by following the procedure described in Example 18 but using 2.62 parts of phenyl isocyanate instead of m-chlorophenyl isocyanate. The yield is 8.9 parts and the melting point is 214° to 215°C.

EXAMPLE 20

The dye of the formula:

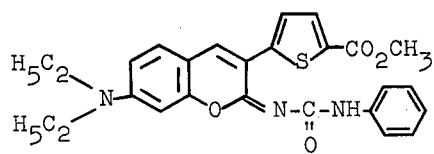

is obtained by adding 0.63 part of phenyl isocyanate and 0.5 part of 30% sodium methylate solution in methanol to a solution of 1.9 parts of 3-(5'-carbomethoxythenyl-2')-7-diethylamino-2-iminocoumarin in 30 parts of xylene, stirring for 2 hours at 90°C and then cooling to about 5°C. After suction filtration and drying 2 parts of dye is obtained having a melting point of 205° to 207°C.

EXAMPLE 21

The dye of the formula:

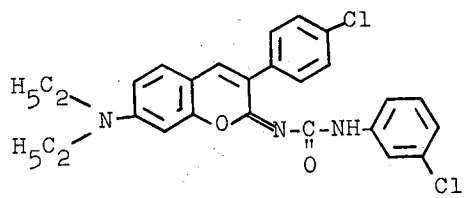

is obtained by reacting 9.5 parts of 3-p-cyanophenyl-7-diethylamino-2-iminocoumarin and 4.61 parts of m-chlorophenyl isocyanate analogously to Example 18. The yield of dye is 11 parts and the melting point is 142° to 143°C.

EXAMPLE 22

The dye of the formula:

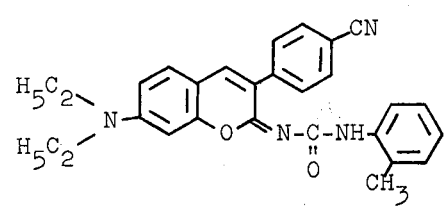

is obtained analogously to Example 18 by reaction of 9.5 parts of 3-p-cyanophenyl-7-diethylamino-2-iminocoumarin and 4 parts of o-toluyl isocyanate. The yield is 11 parts and the melting point is 185° to 186°C.

EXAMPLE 23

The dye of the formula:

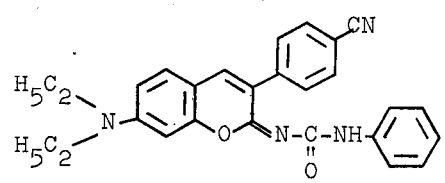

is obtained analogously to Example 18 by reaction of 9.5 parts of 3-p-cyanophenyl-7-diethylamino-2-iminocoumarin and 3.6 parts of phenyl isocyanate. The yield is 12 parts and the melting point is 204° to 205°C.

EXAMPLE 24

The dye of the formula:

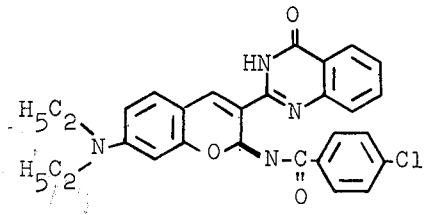

is obtained by dissolving 7.2 parts of 3-quinazolonyl-(2')-7-diethylamino-2-iminocoumarin in 70 parts of pyridine and dripping in 3.85 parts of p-chlorobenzoyl chloride at from 30° to 50°C while stirring and cooling, stirring for another hour at 50°C and then stirring into 1000 parts of water. After suction filtration and drying the yield is 9.8 parts and the melting point is 243° to 244°C.

EXAMPLE 25

The dye of the formula:

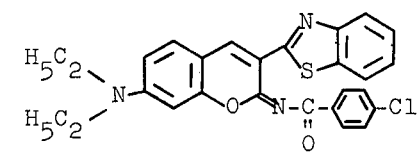

is obtained by proceeding analogously to Example 17 but using 3.5 parts of p-chlorobenzoyl chloride instead of methyl chloroformate. The yield is 7.5 parts and the melting point is 215° to 217°C.

EXAMPLE 26

The dye of the formula:

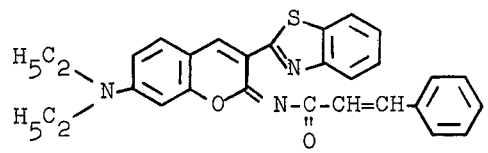

is obtained by proceeding according to Example 17 but using 3.66 parts of cinnamoyl chloride instead of methyl chloroformate. The yield is 8.4 parts and the melting point is 208° to 210°C.

EXAMPLE 27

The dye of the formula:

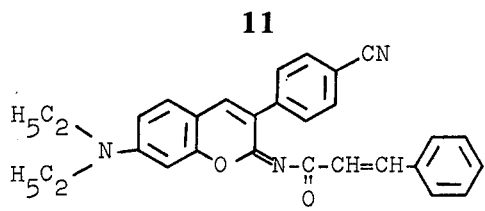

is obtained by proceeding analogously to Example 10 but using cinnamoyl chloride instead of 2,4-dichlorobenzoyl chloride. The yield is 7.4 parts and the melting point is 180° to 182°C.

Dyes characterized in the following Table by reference to their substituents are obtained by methods analogous to those described in Examples 1 to 27:

| Ex | $R^3$ | $R^4$ | $R^8$ |
|---|---|---|---|
| 28 | —CH$_2$—C(=O)—CH$_3$ | —C$_6$H$_4$—CN | CH$_3$ |
| 29 | —C$_3$H$_7$ | —C$_6$H$_4$—CN | CH$_3$ |
| 30 | —CH=CH$_2$ | —C$_6$H$_4$—CN | C$_2$H$_5$ |
| 31 | —CH$_2$— | 3-Cl, 4-CN-C$_6$H$_3$— | C$_2$H$_5$ |
| 32 | —C$_6$H$_4$—NO$_2$ | 3-Cl, 4-CN-C$_6$H$_3$— | C$_2$H$_5$ |
| 33 | —NHC$_4$H$_9$ | —C$_6$H$_4$—CN | CH$_3$ |
| 34 | —CH=CH—C$_6$H$_5$ | 2-methyl-4(3H)-quinazolinone-3-yl | CH$_3$ |
| 35 | —CH=CH$_2$ | 2-methyl-4(3H)-quinazolinone-3-yl | CH$_3$ |
| 36 | —NH—C$_6$H$_4$—Cl | quinazolinyl (P) | C$_2$H$_5$ |
| 37 | —OC$_2$H$_5$ | 2-methyl-4(3H)-quinazolinone-3-yl | C$_2$H$_5$ |

| Ex | R³ | R⁴ | R⁸ |
|---|---|---|---|
| 38 | −O−C₆H₅ | 6-chloro-2-benzothiazolyl | CH₃ |
| 39 | −NH−C₆H₄−CH₃ | 2-benzothiazolyl | CH₃ |
| 40 | −CH₂−OC₄H₉ | 2-(4,7-dimethyl)benzimidazolyl | C₂H₅ |
| 41 | −CH₂−O−COCH₃ | 2-(7-methyl)benzimidazolyl | C₂H₅ |
| 42 | −C₂H₄−OC₆H₅ | 2-(5-methyl)benzimidazolyl (H) | CH₃ |
| 43 | −O−C₆H₁₁ | 2-(5-methyl)benzimidazolyl (H) | CH₃ |
| 44 | −O−C₆H₁₁ | −C₆H₄−NO₂ | CH₃ |
| 45 | −CH₃ | −C₆H₄−NO₂ | CH₃ |
| 46 | −NH−C₆H₄−Cl | −C₆H₄−NO₂ | C₂H₅ |
| 47 | −NH−CH₂−C₆H₅ | −C₆H₄−NO₂ | C₂H₅ |
| 48 | −NH−C₃H₇ | −C₆H₄−NO₂ | C₂H₅ |
| 49 | −CH=CH−C₆H₄−NO₂ | −C₆H₄−NO₂ | C₂H₅ |
| 50 | −NH−C₆H₄−CH₃ | −furyl−CO₂CH₃ | C₂H₅ |
| 51 | −NH−C₆H₄−OCH₃ | −furyl−CO₂CH₃ | C₂H₅ |

| Ex | R³ | R⁴ | R⁸ |
|---|---|---|---|
| 52 | —NH—C₆H₁₁ | furyl—CO₂C₂H₅ | C₂H₅ |
| 53 | 2,4-dichlorophenyl | furyl—CO₂C₄H₉ | CH₃ |
| 54 | 4-methylphenyl | thienyl—CO₂C₂H₅ | C₂H₅ |
| 55 | phenyl | thienyl—CONH₂ | CH₃ |
| 56 | —CH₂—CO₂C₂H₅ | thienyl—CO₂C₂H₅ | CH₃ |
| 57 | —C₂H₄—OC₄H₉ | thienyl—CN | C₂H₅ |

EXAMPLE 58

The dye of the formula:

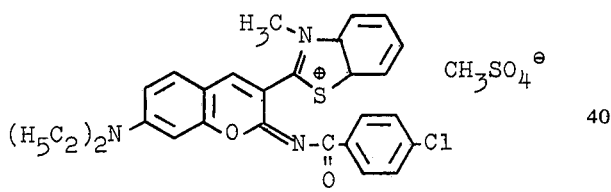

is obtained by dissolving 1.95 parts of 2-(N-p-chlorobenzoyl)imino-3-(benzothiazolyl-2′)-7-diethylaminocoumarin in 40 parts of chlorobenzene and 0.63 part of dimethyl sulfate and stirring the whole for 40 minutes at 120°C. It is then cooled to 20°C and 50 parts of petroleum ether (40/60) is added. The dye is suction filtered and dried. The yield is 1.6 parts and the melting point is 150° to 152°C.

The dyes characterized in the following Table by reference to their substituents are obtained analogously.

| Ex | R³ | R⁴ | R⁸ |
|---|---|---|---|
| 59 | —NH—(3-chlorophenyl) | N-ethyl-benzothiazolium, C₂H₅SO₄⁻ | C₂H₅ |
| 60 | —phenyl | N-methyl-benzothiazolium, CH₃SO₄⁻ | C₂H₅ |
| 61 | —O—C₆H₁₁ | N-methyl-benzothiazolium, CH₃SO₄⁻ | C₂H₅ |
| 62 | —O(CH₂)₂—OCH₃ | N-methyl-benzothiazolium, CH₃SO₄⁻ | C₂H₅ |
| 63 | —CH₃ | N-methyl-benzothiazolium, CH₃SO₄⁻ | C₂H₅ |

EXAMPLE 64

The dye of the formula:

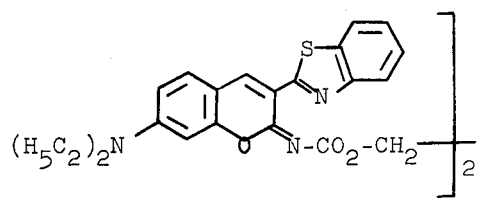

is obtained by dissolving 6.98 parts of 2-imino-3-benzothiazolyl(2′)-7-diethylaminocoumarin in 50 parts of pyridine, adding 3 parts of ethylene glycol bischlorocarbonic ester and stirring for one hour at 50°C. After cooling to 25°C the dye is precipitated with 600 parts of water, suction filtered and dried. The yield is 7.0 parts and the melting point is 285° to 287°C.

EXAMPLE 65

The dye of the formula:

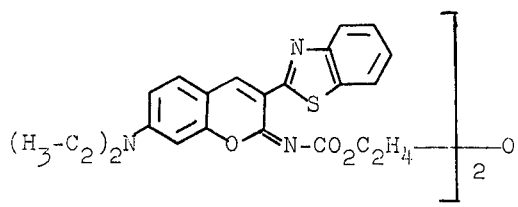

is obtained by dissolving 6.98 parts of 2-imino-3-benzothiazolyl(2')-7-diethylaminocoumarin in 50 parts of pyridine, adding 2.2 parts of diethylene glycol bischlorocarbonic ester and stirring for 1 hour at 50°C. After cooling to 25°C the whole is diluted with 600 parts of water, suction filtered and dried. The yield is 7.1 parts and the melting point is 275° to 277°C.

Dyes in which $m = 2$ and $R^3$ is —CH$_2$—, —CH$_2$CH$_2$— and

are obtained from the acid chlorides analogously.

The corresponding dye with $R^3$ denoting

is obtained by using p-phenylene diisocyanate instead of a chlorocarbonic ester.

We claim:

1. A dye of the formula

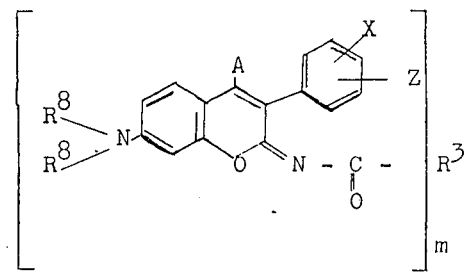

in which $m$ is one of the integers 1 and 2,

A is hydrogen or alkyl of 1 to 4 carbon atoms, $R^8$ is alkyl of 1 to 4 carbon atoms, $R^3$ is when $m = 1$ is alkyl of 1 to 4 carbon atoms, benzyl, phenyl, phenyl substituted by chloro, nitro, methyl or methoxy, vinyl, β-phenylvinyl, alkoxy of 1 to 4 carbon atoms, cyclohexyloxy, phenoxy, β-methoxyethoxy, amino, alkylamino of 1 to 4 carbon atoms, cyclohexylamino, benzylamino, phenylamino or phenylamino substituted by chloro, methyl or methoxy, $R^3$ when $m = 2$ is alkylene of 1 to 3 carbon atoms, phenylene, —O CH$_2$CH$_2$O—, —CH$_2$O CH$_2$— or

X is cyano or nitro and

Z is hydrogen, cyano, chloro, bromo, methylsulfonyl sulfamoyl or nitro.

2. A dye as set forth in claim 1 having the formula

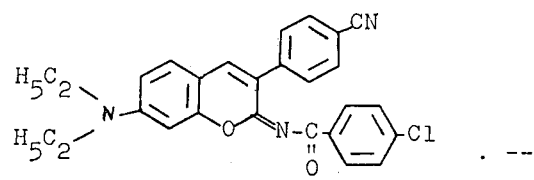

* * * * *